US006728442B2

(12) United States Patent
Missey et al.

(10) Patent No.: US 6,728,442 B2
(45) Date of Patent: Apr. 27, 2004

(54) CONTROLLING THE DISPERSION AND PASSBAND CHARACTERISTICS OF AN ARRAYED WAVEGUIDE GRATING

(75) Inventors: Mark Missey, San Jose, CA (US); Bart Fondeur, Columbus, OH (US); Anca Sala, Columbus, OH (US)

(73) Assignee: JDS Uniphase Corporation, San Jose, CA (US)

( * ) Notice: Subject to any disclaimer, the term of this patent is extended or adjusted under 35 U.S.C. 154(b) by 178 days.

(21) Appl. No.: 09/965,677

(22) Filed: Sep. 27, 2001

(65) Prior Publication Data

US 2002/0176665 A1 Nov. 28, 2002

Related U.S. Application Data

(60) Provisional application No. 60/291,950, filed on May 21, 2001.

(51) Int. Cl.⁷ .............................................. G02B 6/34
(52) U.S. Cl. ........................................................ 385/37
(58) Field of Search ............................ 385/37, 129, 130, 385/131, 132

(56) References Cited

U.S. PATENT DOCUMENTS

| 5,412,744 A | 5/1995 | Dragone | 385/24 |
| 6,195,482 B1 | 2/2001 | Dragone | 385/28 |

OTHER PUBLICATIONS

C. Dragone, "Efficient Techniques for Widening the Passband of a Wavelength Router," Journal of Lightwave Technology, 16, 1895–1906 ( 1998).
C. Dragone, T. Strasser, G.A. Bogert, L.W. Stulz, and P. Chou, "Waveguide Grating Router with Maximally Flat Passband Produced by Spatial Filtering," Electronics Letters, 33, (1997).

G. Lenz, G. Nykolak, and B.J. Eggleton, "Waveguide Grating Routers for Dispersionless Filtering in WDM System at Channel Rate of 10 Gbit/s," Electronics Letters, 34, (1998).

K. Okamoto and A. Sugita, "Flat Spectral Response Arrayed–Waveguide Grating Multiplexer with Parabolic Waveguide Horns," Electronic Letters, 32, (1996).

K. Okamoto and H. Yamada, "Arrayed–Waveguide Grating Multiplexer with Flat Spectral Reponse," Optics Letters 20, 43–44 (1995).

M.K. Smit and C.V. Dam, "Phaser–Based WDM–Devices: Principles, Design and Applications," IEEE J. Quantum Electronics, 2, 236–249 (1996).

M.R. Amersfoort, J.B.D. Soole, H.P. LeBlanc, N.C. Andreadakis, A. Rajhel, and C.Caneau, "Passband Broadening of Integrated Arrayed Waveguide Filters Using Multimode Interference Couplers," Electronics Letters, 32, 449–450 (1996).

*Primary Examiner*—Javaid H. Nasri
(74) *Attorney, Agent, or Firm*—Allen, Dyer, Doppelt, Milbrath & Gilchrist, P.A.

(57) ABSTRACT

A method for designing an arrayed waveguide grating that includes input and output couplers, input and output slabs, and a plurality of arms connecting the input and output slabs includes steps of determining a desired amplitude response for the arrayed waveguide grating. A desired dispersion response for the arrayed waveguide grating is determined. Input and output couplers are designed to produce the desired amplitude response. The lengths of the arms of the arrayed waveguide grating are perturbed to produce a flat or linear dispersion. In addition, the polarity of a group delay, dispersion and dispersion slope response of an arrayed waveguide grating can also be changed by adjusting Individual lengths of the waveguide arms. The group delay, dispersion and dispersion slope of a multiplexer and a demultiplexer can be matched to substantially cancel.

6 Claims, 8 Drawing Sheets

CONTROLLING THE DISPERSION AND PASSBAND CHARACTERISTICS OF AN ARRAYED WAVEGUIDE GRATING

CROSS-REFERENCE TO RELATED APPLICATIONS

This application claims the benefit of U.S. Provisional Application No. 60/291,950, filed May 21, 2001, which is hereby incorporated by reference.

FIELD OF THE INVENTION

The present invention relates to arrayed waveguide gratings, and more particularly to systems and methods for controlling both the dispersion and passband characteristics of arrayed waveguide gratings.

BACKGROUND OF THE INVENTION

Dispersion of a material relates to the speed that energy at different wavelengths travels through a material. Controlling the dispersion of arrayed waveguide gratings (AWGs) will be essential in 40 Gigabit per second (Gbps) transmission systems and in spectrally efficient 10 Gbps systems (50 GHz spacing). Having the ability to design the dispersion characteristics in an AWG offers significant advantages.

AWGs typically include an input waveguide, a slab free-propagation region, an arrayed waveguide grating, a slab-focusing region and output waveguides. Conventional AWG designs have obtained a flattened AWG intensity passband by applying a multi-modal structure (MMI, parabolic horn, etc . . . ) to the standard AWG design at the entrance of one slab and a standard taper on the other slab. Because the passband is the result of the convolution between the two modes, the spectrum gets flattened. However, this design method leads to high dispersion and dispersion slope in the passband due to the non-flat phase of the multi-modal structure.

A second approach modifies the arrayed waveguide gratings to generate a sinc-like distribution that leads to a dispersion-free flattened passband. This approach uses a standard input/output in the slabs but modifies the amplitude distribution by adding some loss on some waveguides (amplitude) and changing the length of some waveguides (phase).

In U.S. Pat. No. 6,195,482 to Dragone, which is hereby incorporated by reference, the design of an arrayed waveguide grating is optimized by adjusting arm lengths and utilizing multi-mode input and output couplers to produce a specified passband behavior. Control of dispersion of AWGs is not discussed.

SUMMARY OF THE INVENTION

A method according to the invention for designing an arrayed waveguide grating that includes input and output couplers, input and output slabs, and a plurality of arms connecting the input and output slabs includes the step of determining a desired amplitude response for the arrayed waveguide grating. A desired dispersion response for the arrayed waveguide grating is determined. Input and output couplers are designed to produce the desired amplitude response. The lengths of the arms of the arrayed waveguide grating are perturbed to produce a flat or linear dispersion.

In another aspect of the invention, an arrayed waveguide grating includes input and output couplers, input and output slabs, and a plurality of arms connecting the input and output slabs. The input and output couplers produce a desired amplitude response for the arrayed waveguide grating. A length of the arms is adjusted to produce a flat or linear dispersion.

In yet another aspect of the invention, an arrayed waveguide grating includes a parabolic input coupler, a parabolic output coupler and an input slab connected to the parabolic input coupler. An output slab is connected to the parabolic output coupler. A plurality of arms connect the input and output slabs. The parabolic input and output couplers produce a flat passband response. Individual lengths of the arms are adjusted to produce a flat dispersion response.

In still another aspect of the invention, a method for changing the sign of a linear dispersion response of an arrayed waveguide grating includes the steps of connecting an input coupler to an input slab. An output coupler is connected to an output slab. The input and output slabs are connected using a plurality of waveguide arms. Individual lengths of the waveguide arms are adjusted to reverse the sign of a group delay, dispersion and dispersion slope of the arrayed waveguide grating.

In yet another aspect of the invention, an optical system includes a multiplexer that multiplexes a plurality of optical signals that are input to the multiplexer and outputs a multiplexed optical signal. The multiplexer has a first group delay, a first dispersion and a first dispersion slope. The first group delay, the first dispersion and the first dispersion slope have one of a positive and negative polarity. A demultiplexer demultiplexes the multiplexed optical signal that is input to the demultiplexer and outputs the plurality of optical signals. The demultiplexer has a second group delay, a second dispersion and a second dispersion slope. The second group delay, the second dispersion and the second dispersion slope have the other of a positive and negative polarity. The first and second group delay, dispersion and dispersion slope substantially cancel.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A method according to the invention for designing the intensity passband of an AWG is also used to simultaneously design the AWG dispersion properties. Uniform-dispersion (zero-dispersion slopes), flattened-passband devices can be easily fabricated and more complicated dispersion profiles can also be constructed with more sophisticated AWG designs.

The present invention allows the design of the complex transmission response of an AWG (i.e. dispersion and insertion loss). The present invention can be used, for example, to remove the dispersion slope that is inherent in conventional designs of flattened passband devices using parabolic input horns or other multi-modal inputs. By adjusting the arm lengths in the arrayed waveguide, the current flattened passband designs are perturbed to provide zero dispersion-slope devices with reduced in-band dispersion. By slightly modifying the amplitude distribution, the dispersion can be compensated to 0, with some low loss penalty. In addition, adjusting both the input/output waveguide horns and the arrayed waveguide arm lengths offers significant flexibility in tailoring the passband insertion loss and dispersion characteristics of the AWG.

Figure 1A:
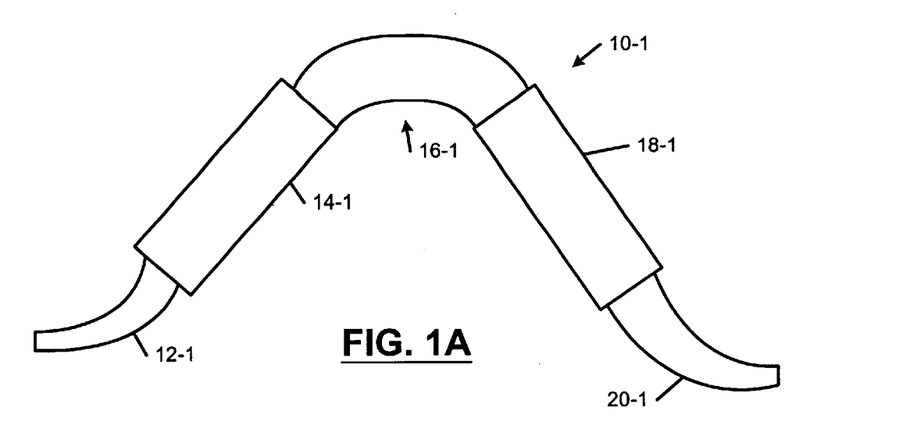
FIG. 1 illustrates an arrayed waveguide grating (AWG)
Figure 1B:
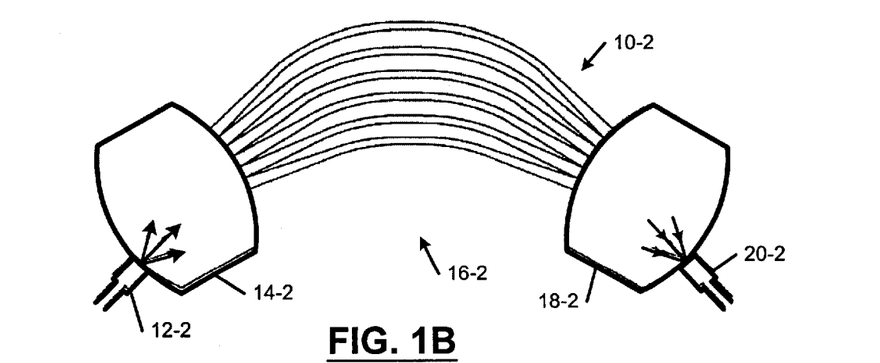
Figure 1C:
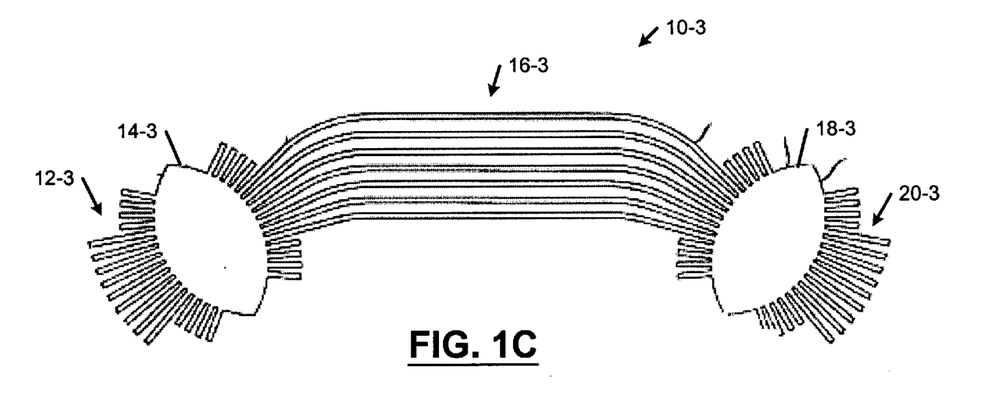

Referring now to FIGS. 1A, 1B, and 1C, an AWG 10 includes an input waveguide or coupler 12, a slab free-propagation region 14, an arrayed waveguide grating 16, slab-focusing region 18, and output waveguides or coupler 20. In FIG. 1B, the input waveguide or coupler 16-2 is a multimode coupler. In current designs, the length of the m$^{th}$ waveguide in the arranged waveguide grating 16 is given by the grating equation $L_m = L_{m-1} + L = L_0 + mL$.

Figure 2:
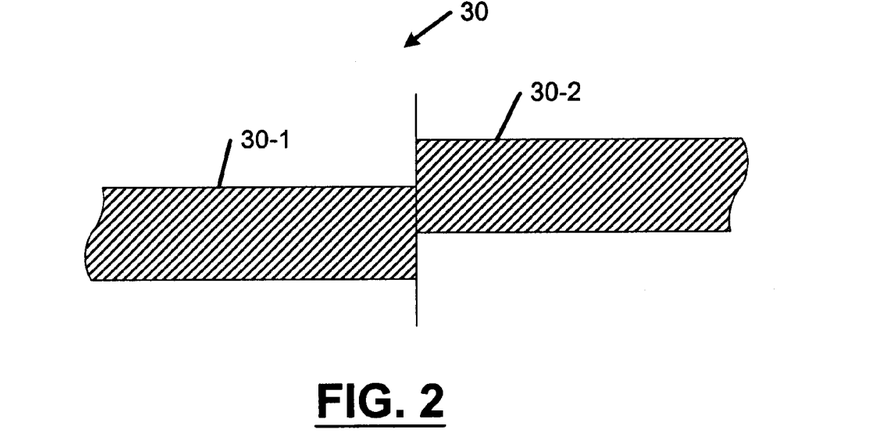
FIG. 2 illustrates an offset arm for adjusting amplitude.
Figure 3A:
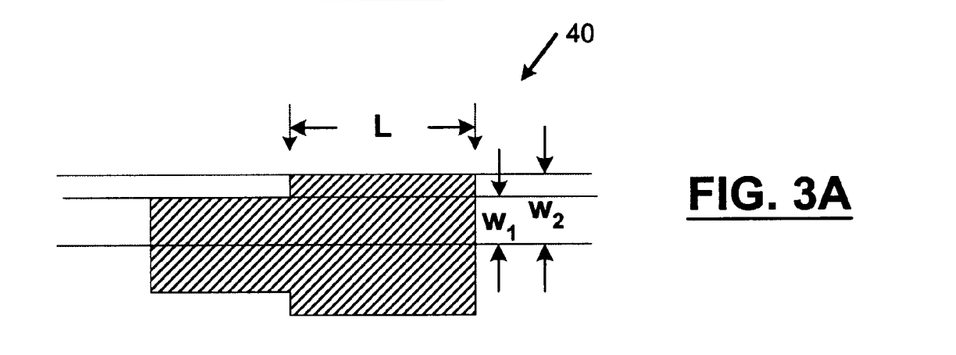
FIGS. 3A–3C illustrate various multimode horn couplers.
Figure 3B:
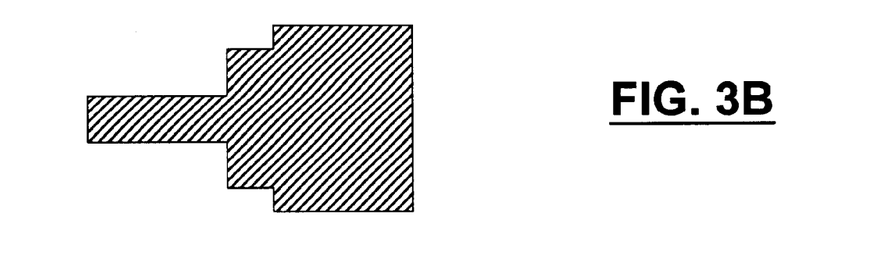
Figure 3C:
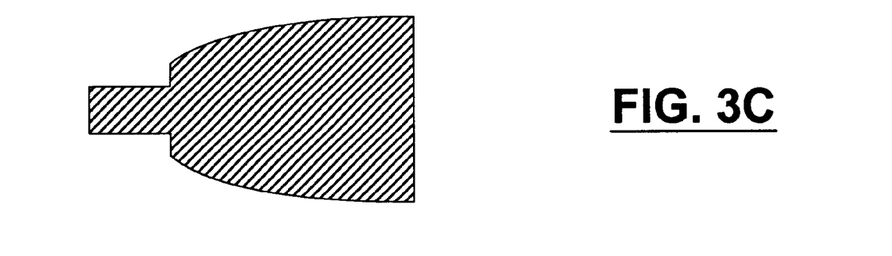

In FIG. 2, an arm 30 has first and second sections 30-1 and 30-2 that are offset. The amount of offset can be varied to adjust the amplitude of the optical signal carried by the arm 30. In FIGS. 3A, 3B, 3C, multiple multimode horn couplers are shown. In FIG. 3A, dimensions L, W and W$_2$ of a horn coupler 40 can be varied to adjust the mode response of the coupler 40 as is set forth in Dragone '482.

The optical path difference between all adjacent waveguides is given by a fixed value, as in a standard grating. Previous attempts to obtain a flat passband AWG employ a parabolic-horn, MMI, or other waveguide structure to the standard AWG design to generate a field with several peaks at the input and a standard waveguide or taper at the output.

Figure 4:
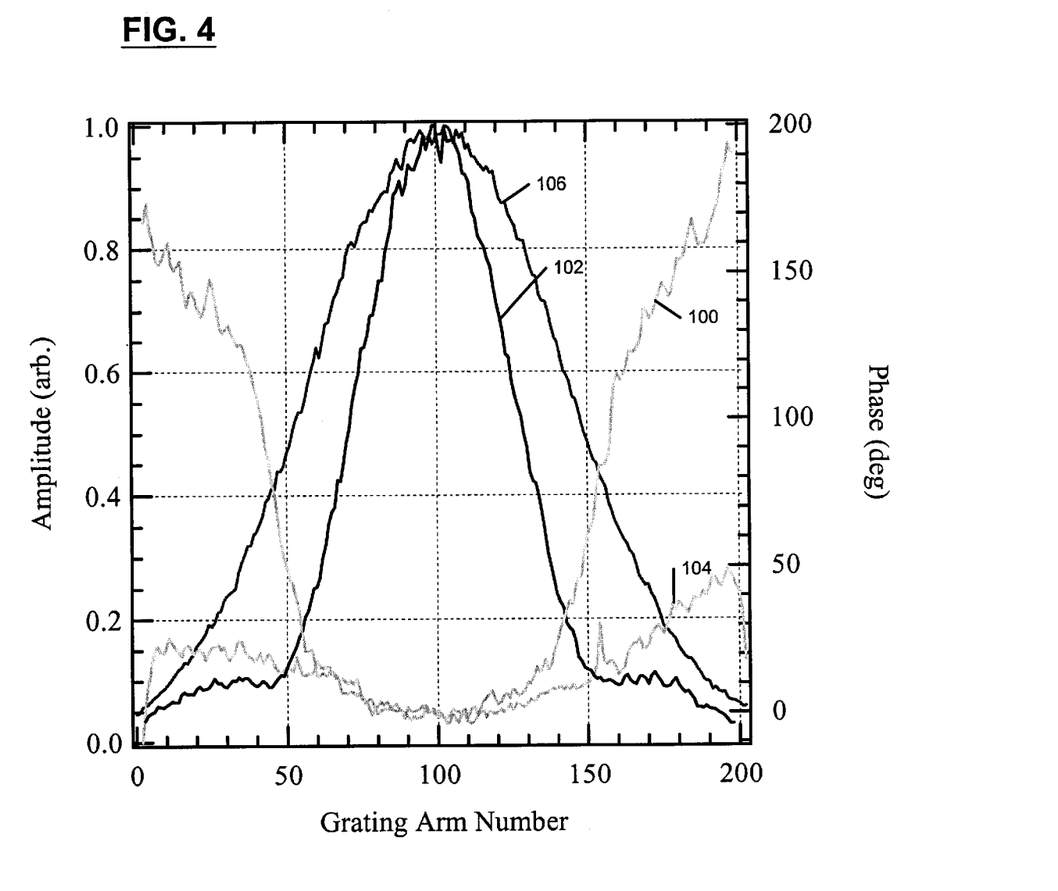
FIG. 4 illustrates measured amplitude and phase of the complex coefficient $a_m$ for Gaussian and flattened AWG devices.
Figure 5:
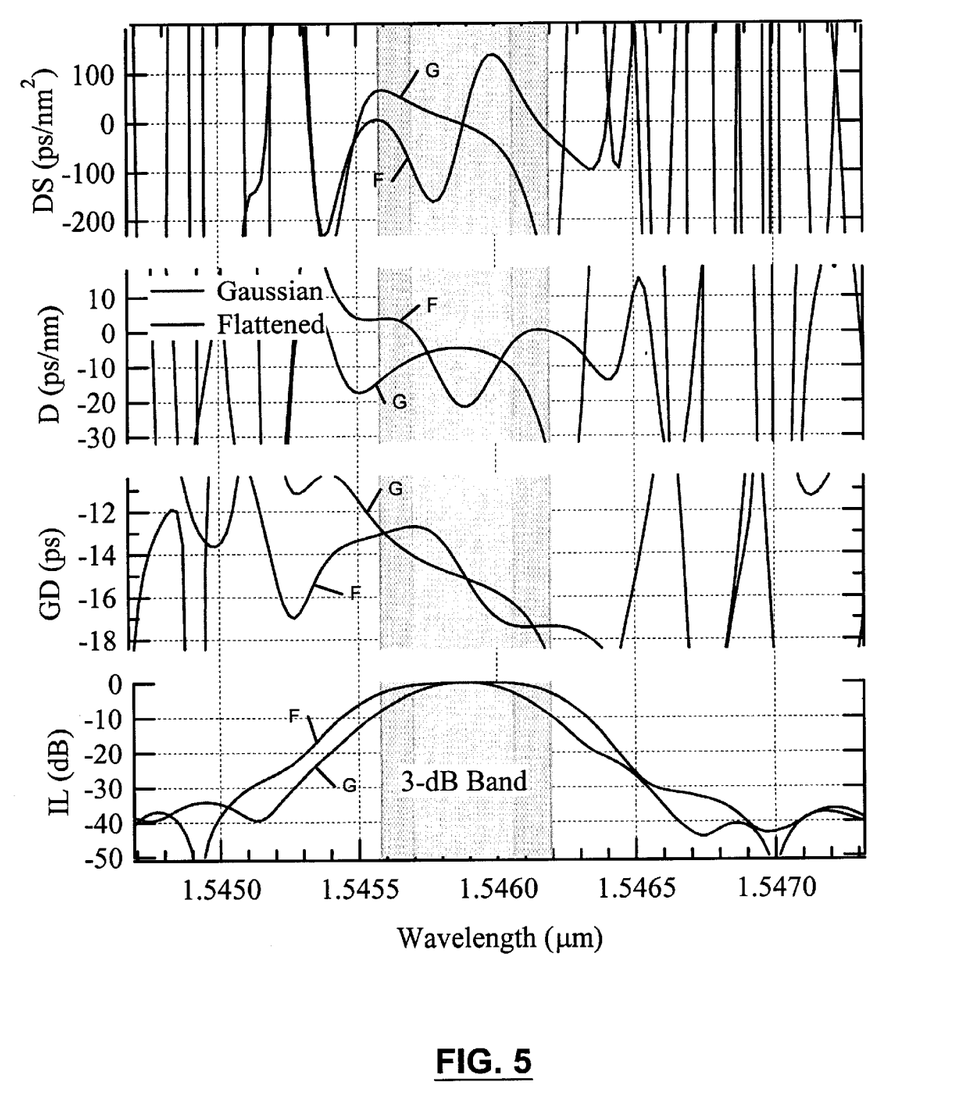
FIG. 5 illustrates transmission insertion loss, group delay, dispersion, and dispersion slope of 100 GHz Gaussian and flattened AWG devices.

In general, the complex transmission of an AWG is given by the complex sum of the field contributions from all of the possible paths through the arms of the arrayed waveguide as:

$$T(v) = \sum_m a_m \exp(i 2\pi v n \Delta L m / c) \quad \text{Eq. (1)}$$

where v is the optical frequency of interest, n is the refractive index, ΔL is the physical path length difference between adjacent waveguides, and a$_m$ is the complex transmission coefficient coupling the input waveguide to the output waveguide through the m$^{th}$ arm in the arrayed waveguide grating. The coefficient a$_m$ therefore depends on the mode distributions in the input and output waveguides and on the path length of the m$^{th}$ arm in the waveguide grating. The transmission magnitude determines the insertion loss spectrum, IL=|T(v)|$^2$. The transmission phase, φ(v)=arg(T(v)), determines the group delay, GD=(½π) dΦ(v)/dv, and the dispersion, D=(2 π)$^{-1}$d$^2$Φ(v)/(dvdλ). For example, FIGS. 4 and 5 show the measured a$_m$ coefficients and corresponding transmission characteristics for PIRI flattened-passband (phase 100 and amplitude 102) and Gaussian-passband (phase 104 and amplitude 106) devices.

In general, any arbitrary desired function T(v) can be generated with the appropriate array amplitude and phase distribution coefficients a$_m$. In practice, the complexity of T(v) that can be reasonably generated is limited by the number of waveguides that must be illuminated (this limits the high frequency content of T(v)) and by the insertion loss (caused by the amplitude mismatch between a$_m$ and the far-field diffraction patterns of the input and output waveguides). Given a desired complex transmission function T(v) (which according to Eq. 1 has a fundamental period in optical frequency of FSR=c/nΔL), the required complex amplitude coefficients required to realize that transmission function are given by $\alpha_m = FT[T(v)]|_{\tau = mn\Delta L/c}$ (Eq. 2).

As mentioned previously, the AWG design complex transmission coefficients a$_m$ are fundamentally determined by the mode structure of the input and output waveguides and by the waveguide path lengths of the grating. In current designs, the grating waveguide path lengths are fixed by the grating equation. The present invention adjusts or perturbs the lengths of the individual waveguides in the arrayed waveguide array, rather than fixing them by the grating equation L$_m$=L$_0$+mΔL. By adjusting the lengths of the m$^{th}$ waveguide in the array, the phase of the complex amplitude coefficient a$_m$ can be arbitrarily constructed as a$_m$'=a$_m$ exp(i2πnΔL$_m$'), where a$_m$ is the coefficient corresponding to a standard grating array (i.e. with constant length different ΔL between adjacent waveguides), and ΔL$_m$' is the additional length designed into the m$^{th}$ waveguide. This technique introduces an extra degree of freedom in the AWG design and provides a simple method to modify current designs. By perturbing the lengths of the arrayed waveguides, the passband insertion loss spectrum and dispersion characteristics can be modified according to Eq. 1. This has potential use, for example, in removing the dispersion non-uniformity present in current flattened-passband AWG devices.

Figure 6:
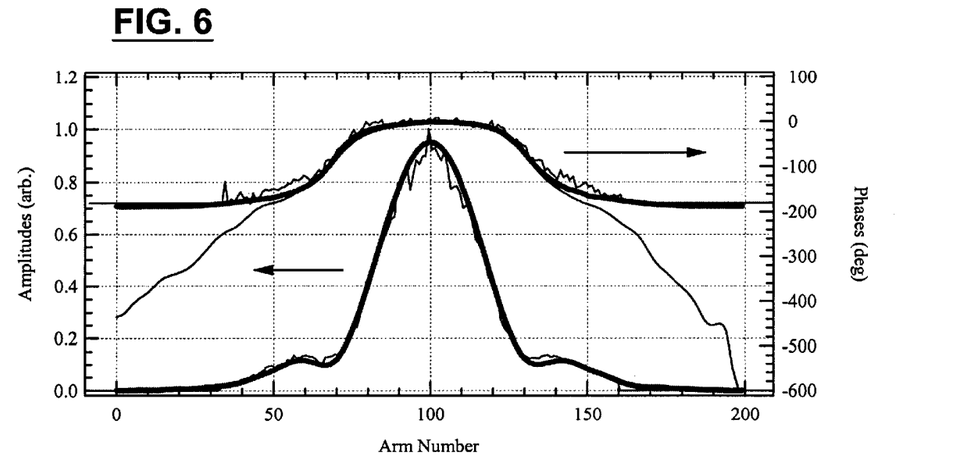
FIG. 6 illustrates phase and amplitude response for the original 16-ch. flattened design (calculated and measured) and a new uniform-dispersion design.
Figure 7:
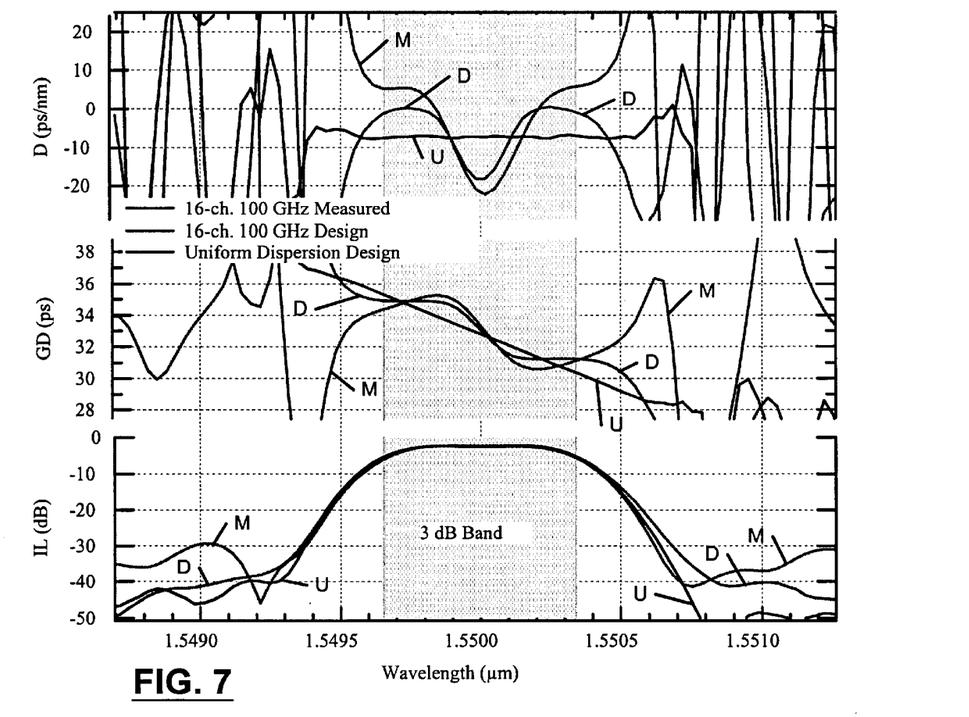
FIG. 7 illustrates insertion loss, group delay, and dispersion for the original 16-ch. flattened design (using measured and calculated phase and amplitudes) and a new uniform-dispersion design.

For example, the calculated and measured device phases and amplitudes (i.e. coefficients a$_m$) of a 16-channel, 100 GHz flattened passband AWG are shown in FIG. 6, with the corresponding insertion loss, group delay, and dispersion spectra shown in FIG. 7. The non-uniform dispersion peak at the passband center in the original AWG design is caused by the parabolic horn tapers on the input waveguide, which are required to generate the flattened passband insertion loss spectrum. A uniform-dispersion design with the same insertion loss spectrum is obtained by perturbing the original phase distribution to form the uniform-dispersion phase distribution shown in FIG. 6. This phase perturbation is physically implemented by adjusting the individual lengths of the arrayed-grating waveguides. The required perturbed phases are calculated using the above Fourier analysis technique (i.e. Eq. 2) and are shown in FIG. 6. The new flattened dispersion insertion loss, group delay, and dispersion responses are shown in FIG. 7. Implementation of this new design requires only an adjustment of the individual arrayed waveguide arm lengths to provide the proper perturbation phase. No redesign of the input and output waveguides is required.

It is also possible to reverse the sign of the dispersion of an AWG by only perturbing the arrayed waveguide lengths (i.e. phases). This can be seen directly from Eq. 1. Specifically, if the phase and amplitude responses are symmetric (this is generally true), and if two sets of coefficients are related by $b_m = a_m^*$ (that is, if $a_m = |a_m| \exp(i\Phi_m)$ and $b_m = |b_m| \exp(i\Phi_m)$, then $y_m = -\Phi_m$.) then their corresponding complex transmission functions will be related by $$T_a(v) = \sum_m a_m \exp(i 2\pi v n \Delta L m / c)$$

$$T_b(v) = \sum_m b_m \exp(i 2\pi v n \Delta L m / c)$$

so that
$T_a(v) = T_b(v)^*$

This means that given a set of amplitude and phase coefficients, $a_m$, if the sign of the phase is flipped, then the resulting complex transmission will have the same magnitude (i.e. same insertion loss spectrum) but will have a phase with an opposite sign. This translates to the group delay, dispersion, and dispersion slope also having the opposite signs. This could have use in MUX and DEMUX AWGs that have dispersions of opposite signs for cancellation.

In general, changing the phase (i.e. dispersion) response of the AWG requires changes in both the phase and amplitude of the coefficients $a_m$. The most straightforward method of sculpting the amplitude coefficients is to introduce loss in the waveguide array in such a way that the amplitude distribution determined by the input/output waveguide far-field patterns is converted into the desired amplitude distribution. The degree of mismatch between the two distributions therefore directly translates into additional insertion loss. In order to avoid this mismatch insertion loss, the required amplitude distribution (which is determined by the shape of the input and output waveguides) should not be significantly changed.

Figure 8:
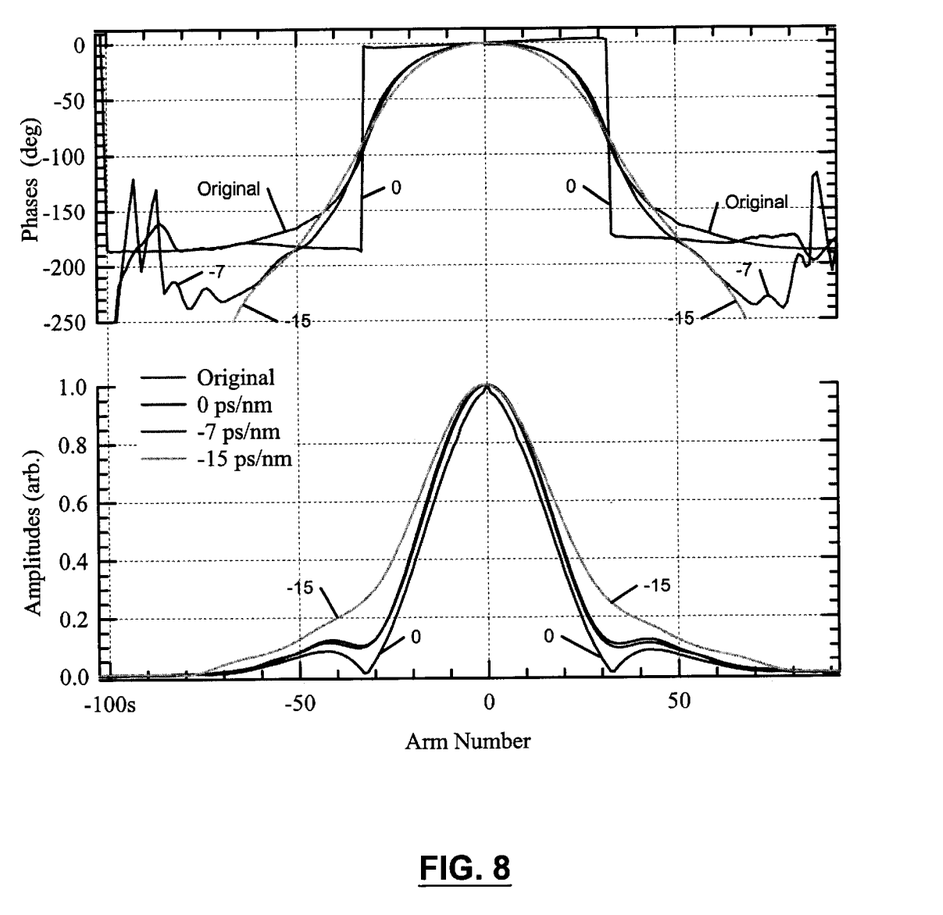
FIG. 8 illustrates calculated phase and amplitude coefficients for the original design and for uniform dispersion designs with 0 ps/nm, −7 ps/nm, and −15 ps/nm.
Figure 9:
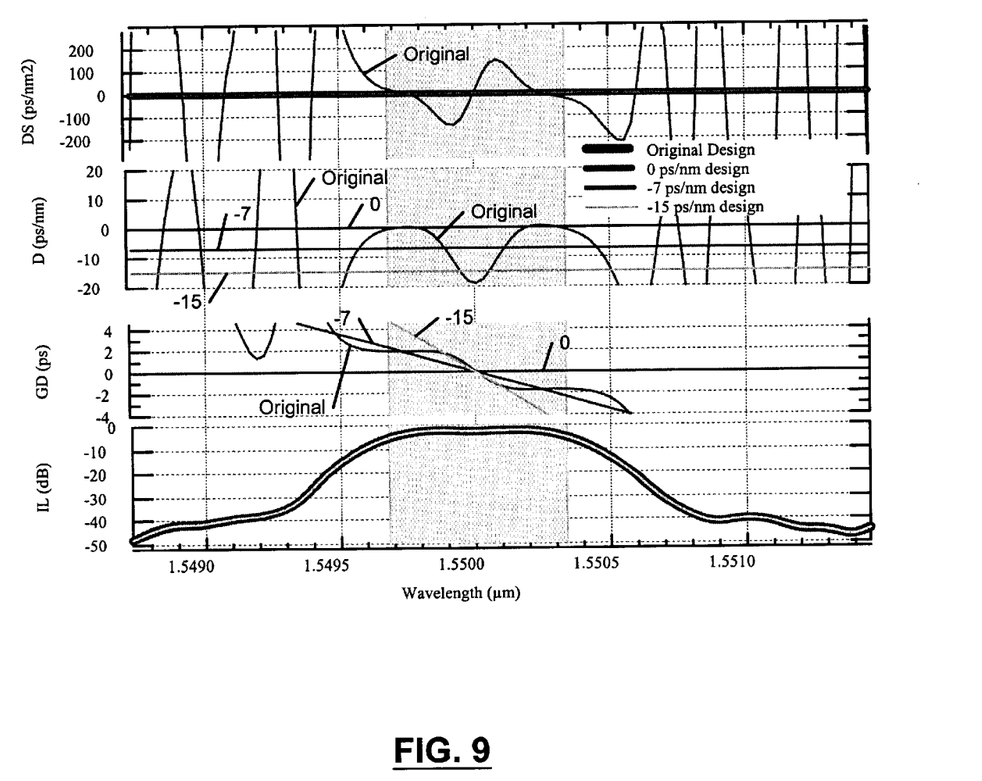
FIG. 9 illustrates calculated insertion loss, group delay, and dispersion spectra for the original design and for uniform dispersion designs with 0 ps/nm, −7 ps/nm, and −15 ps/nm.
Figure 10:
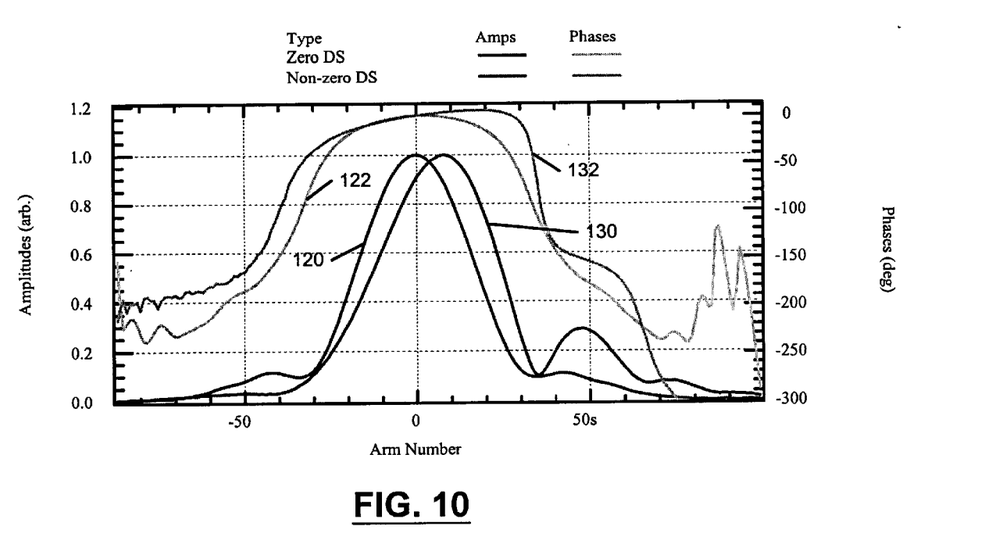
FIG. 10 illustrates calculated phase and amplitude coefficients for a zero-dispersion slope design (D=−7 ps/nm, DS=0) and a non-zero dispersion slope design (D=−7 ps/nm, DS=100 ps/nm$^2$)
Figure 11:
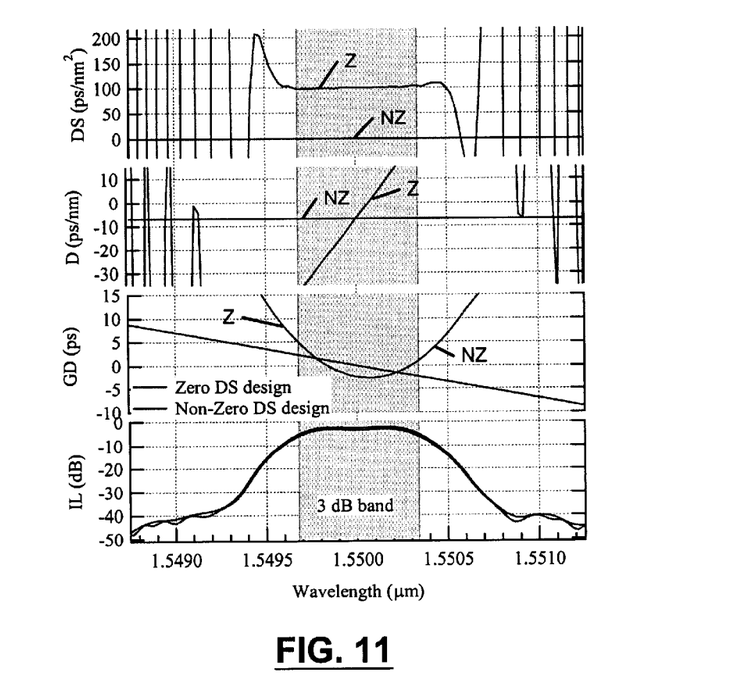
FIG. 11 illustrates calculated insertion loss, group delay, and dispersion spectra for a zero-dispersion slope design (D=−7 ps/nm, DS=0) and a non-zero dispersion slope design (D=−7 ps/nm, DS=100 ps/nm$^2$).

FIGS. 8 and 9 show the limitation this imposes, as the designed dispersion is shifted from 0 ps/nm to −15 ps/nm. In general, this amount of acceptable insertion loss caused by the amplitude mismatches severely limits the ability to arbitrarily design the passband characteristics of an AWG. However, it is possible to overcome this limitation by designing the input/output waveguides to generate the desired amplitude distribution within the arrayed grating and subsequently adjusting the arrayed grating arm lengths to tailor the overall phase distribution. This extra degree of freedom relaxes the severe limitations placed on the achievable passband characteristics using only perturbations to the arrayed grating lengths. More freedom in arbitrarily designing the amplitude and phase characteristics of an AWG allow designs incorporating, for example, a non-zero dispersion slope within the passband, as shown in FIGS. 10 and 11. Zero dispersion slope has an amplitude 120 and a phase 122. Non-zero dispersion slope has an amplitude 130 and a phase 132.

Standard flattened designs exhibit inherent dispersion non-uniformity at the passband center. This dispersion originates from the far-field phase and amplitude response of the input waveguide parabolic horns. The present invention can be used to perturb the flattened passband AWG phase response in such a way as to make the dispersion more uniform without adding some loss in the array. A second application of this method is to reverse the sign of the AWG dispersion.

In addition, the insertion loss and dispersion characteristics of an AWG can be controlled by tailoring the effective amplitude and phase response of the device. In order to minimize insertion loss and maximize design flexibility of the insertion loss and dispersion characteristics, the input and output parabolic horns are designed to provide the correct device amplitude response, while the lengths of the individual arrayed-grating waveguides are adjusted to achieve the correct phase response. In this way, devices can be designed with minimum insertion loss and maximum control over both the passband insertion loss and dispersion characteristics. Control of the amplitude response may also include offsetting arms as is illustrated in FIG. 2.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An arrayed waveguide grating, comprising:
   input and output couplers;
   input and output slabs; and
   a plurality of arms connecting said input and output slabs, wherein said input and output couplers produce a desired amplitude response for said arrayed waveguide grating; and
   wherein lengths of said arms are adjusted to produce a desired dispersion.

2. The arrayed waveguide grating of claim 1 wherein said desired dispersion is a flat dispersion.

3. The arrayed waveguide grating of claim 1 wherein said desired dispersion is a linear dispersion.

4. The arrayed waveguide grating of claim 1 wherein said input and output couplers are horn couplers.

5. An arrayed waveguide grating, comprising:
   a parabolic input coupler;
   a parabolic output coupler;
   an input slab connected to said parabolic input coupler;
   an output slab connected to said parabolic output coupler; and
   a plurality of arms connecting said input and output slabs, wherein said parabolic input and output couplers produce a flat passband response and wherein individual lengths of said arms are adjusted to produce a flat dispersion response.

6. An optical system comprising:
   a multiplexer that multiplexes a plurality of optical signals that are input to said multiplexer and that outputs a multiplexed optical signal, wherein said multiplexer has a first group delay, a first dispersion and a first dispersion slope, wherein said first group delay, said first dispersion and said first dispersion slope have one of a positive and negative polarity; and a demultiplexer that demultiplexes said multiplexed optical signal that is input to said demultiplexer and that outputs said plurality of optical signals, wherein said demultiplexer has a second group delay, a second dispersion and a second dispersion slope, wherein said second group delay, said second dispersion and said second dispersion slope have the other of a positive and negative polarity, and wherein said first and second group delay dispersion, and dispersion slope substantially cancel.

* * * * *